US008117602B2

(12) United States Patent
Pavlyushchik (10) Patent No.: US 8,117,602 B2
(45) Date of Patent: *Feb. 14, 2012

(54) METHOD AND SYSTEM FOR MONITORING EXECUTION PERFORMANCE OF SOFTWARE PROGRAM PRODUCT (75) Inventor: Mikhail A. Pavlyushchik, Moscow (RU)

(73) Assignee: Kaspersky Lab, ZAO, Moscow (RU)

( * ) Notice: Subject to any disclaimer, the term of this patent is extended or adjusted under 35 U.S.C. 154(b) by 988 days.

This patent is subject to a terminal disclaimer.

(21) Appl. No.: 12/060,832

(22) Filed: Apr. 1, 2008

(65) Prior Publication Data
US 2010/0281468 A1 Nov. 4, 2010

(51) Int. Cl.
*G06F 9/44* (2006.01)
*G06F 11/00* (2006.01)
(52) U.S. Cl. ........ 717/128; 717/124; 717/127; 717/131; 714/45
(58) Field of Classification Search .................. None
See application file for complete search history.

(56) References Cited

U.S. PATENT DOCUMENTS

| 5,504,891 | A  | * | 4/1996  | Motoyama et al. | 715/236  |
|-----------|----|---|---------|-----------------|----------|
| 6,118,940 | A  | * | 9/2000  | Alexander et al.| 717/127  |
| 6,658,654 | B1 | * | 12/2003 | Berry et al.    | 717/131  |
| 6,662,362 | B1 | * | 12/2003 | Arora et al.    | 717/154  |
| 6,760,903 | B1 |   | 7/2004  | Morshed         |          |
| 7,134,117 | B2 | * | 11/2006 | Swaine          | 717/128  |
| 7,200,588 | B1 | * | 4/2007  | Srivastava et al.| 1/1     |
| 7,774,746 | B2 | * | 8/2010  | Mansfield et al.| 717/106  |
| 2002/0152241 | A1 | * | 10/2002 | Hepworth et al. | 707/523  |
| 2005/0203952 | A1 | * | 9/2005  | Deily et al.    | 707/104.1|
| 2005/0223282 | A1 |   | 10/2005 | Frey et al.     |          |
| 2007/0234016 | A1 |   | 10/2007 | Davis           |          |

FOREIGN PATENT DOCUMENTS

WO  WO 01/39012  5/2001

OTHER PUBLICATIONS

Larus, J.R., "Efficient Program Tracing," Computer, IEEE Service Center, 26:5, pp. 52-61, May 1, 1993.
Search Report in EP 09155134.1-1225, dated Jun. 15, 2009.

* cited by examiner

*Primary Examiner* — Insun Kang
(74) *Attorney, Agent, or Firm* — Bardmesser Law Group (57) ABSTRACT A method, computer program product and system for monitoring execution behavior of a program product in a data processing system include development of a trace tool having trace strings written in a human language and provided with data fields for diagnostic information relevant to executable portions of the program product. Identifiers of the trace tool, trace strings, and data fields and components of the diagnostic information are encoded using a coded binary language. After monitoring execution of the program product, a trace report of the trace tool is translated for an intended recipient from the coded binary language into the human language, whereas an unauthorized access to the contents of the trace record is restricted. The encoding or decoding operations are performed using databases containing the respective identifiers and components of the diagnostic information in the coded binary language and the human language.

14 Claims, 6 Drawing Sheets

METHOD AND SYSTEM FOR MONITORING EXECUTION PERFORMANCE OF SOFTWARE PROGRAM PRODUCT

BACKGROUND OF THE INVENTION

1. Field of the Invention

The present invention relates to software execution monitoring tools, and more particularly, to a method and system for monitoring execution behavior of a software program product in a data processing system.

2. Description of the Related Art

Software execution monitoring tools are used to monitor execution behavior of program products in data processing systems. For example, a monitoring tool may identify execution errors and measure effectiveness of utilization of system resources or implementation of particular operations of software modules or application programs, among other execution behavior monitoring functions.

A trace tool is a software execution behavior monitoring tool that is primarily used for detecting execution flows in a monitored program product. Conventionally, the trace tool is a software program custom-developed for a particular program product. In operation, the trace tool keeps track of particular sequences of executable instructions in the program product by using event-based profiling techniques, which allow to log certain events as they occur or trace execution of arbitrary code segments of interest. A time-stamped record is produced for each such event, and the individual records are integrated in the tool trace report. To assure prompt interpretation, the trace reports and component individual records thereof are produced as text documents written in a non-coded (i.e., readable) human language.

For individuals skilled in the art, the trace reports allow a high degree of insight in architectural and operational features of the respective program products and may lead to an unauthorized access to such features. Therefore, attempts have been made to encode the contents of the trace reports in a manner that would not delay their interpretation by the intended party and protect the contents from an unauthorized use by third parties.

U.S. Pat. Nos. 6,754,890 and 6,988,263 disclose methods for protecting the trace reports directed to minimizing of an amount of diagnostics available to or accessible by the third parties. However, these references address only a few aspects of techniques for protecting information in the contents of the trace reports.

Despite considerable efforts devoted to encoding of the trace reports, their contents are still vulnerable to many third parties at ever-increasing level of sophistication. Therefore, there is a need in further improvements in techniques for monitoring execution behavior of program products in the data processing systems.

SUMMARY OF THE INVENTION

Accordingly, the present invention is directed to software behavior monitoring tools, and more particularly, to a method and system for monitoring execution behavior of program products in data processing systems that substantially obviates one or more of the disadvantages of the related art.

According to one embodiment, a method of monitoring execution of a program product includes the steps of developing a trace tool having, in a human language, trace strings including data fields for diagnostic information related to executable portions of the program product; encoding contents of the trace tool using the coded binary language; monitoring execution of the program product using the trace tool; producing an encoded trace report; and decoding, for an intended recipient, the trace report in the human language.

Encoding the contents of the trace tool includes coding identifiers of the trace tool, trace strings, and data fields using a coded binary language, and adapting the trace tool for storing the diagnostic information of the monitored program product using the coded binary language.

The contents of the trace report are encoded and decoded using databases selectively storing and cross-referencing the respective identifiers and components of the diagnostic information in the coded binary language and the human language. In one exemplary embodiment, a coded trace string is a binary sequence including a binary word encoding an identifier of the trace tool and one or more binary words encoding identifiers of the trace string, data fields, and diagnostic information.

In applications, such techniques (i) allow a developer of the program product or other intended party to review the diagnostic information written in his/her human language, thus providing high efficiency of analysis of operational characteristics of the program product, and (ii) prevent third parties, including a user of the program product, from an unauthorized access to the product diagnostic information and, potentially, proprietary features of the product.

Another embodiment of the present invention provides a system implementing portions of the inventive method for monitoring execution behavior of a program product.

Yet another embodiment of the present invention provides a computer program product that, when executed by a computer processor, implements portions of the inventive method for monitoring execution behavior of a program product.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and, together with the description, serve to explain the principles of the invention.

In the drawings.

DETAILED DESCRIPTION OF THE PREFERRED EMBODIMENTS

The term "exemplary" is used herein to mean "serving as an example, instance, or illustration." Any embodiment or design described herein as "exemplary" is not necessarily to be construed as preferred or advantageous over other embodiments or designs.

Reference will now be made in detail to the preferred embodiments of the present invention, examples of which are illustrated in the accompanying drawings.

Figure 1:
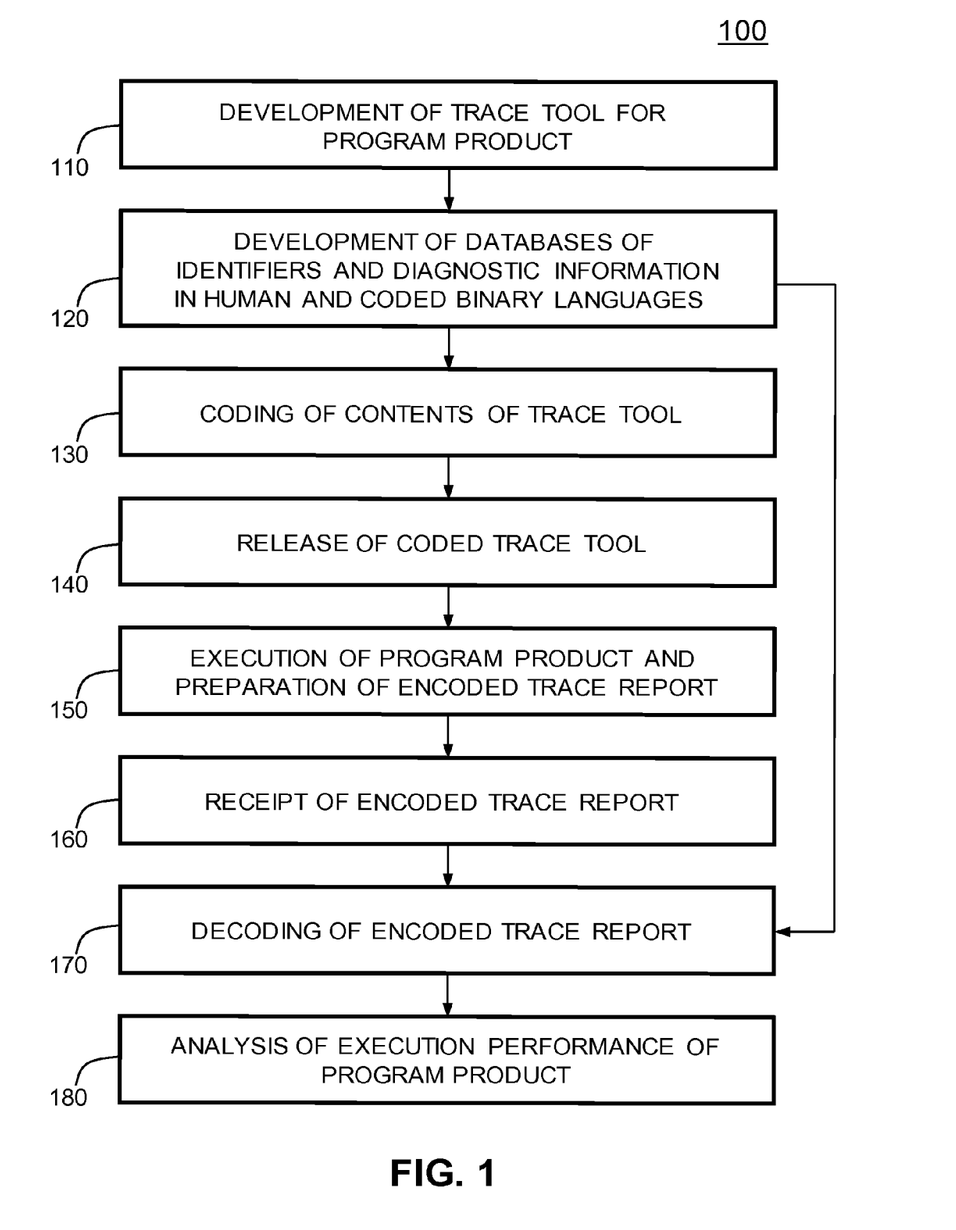
FIG. 1 illustrates a method of monitoring execution behavior of a program product in a data processing system in accordance with one embodiment of the present invention.

With reference to FIG. 1, in one embodiment of the present invention, a method 100 of monitoring execution behavior of a program product in a data processing system starts at step 110, where a trace tool is developed for a particular program product, for example, an operating system, an application program, or a software component thereof. The trace tool can include executable code and data in any number of formats, such as libraries, DLLs, source code, databases, etc. The trace tool includes a plurality of trace strings that are selectively associated with operations performed by the program product. Each trace string has one or more data fields for recording diagnostic information related to executable instructions of the program product. In some embodiments, the trace tool is a component of the program product that is developed contemporaneously with other components thereof.

To present the diagnostic information in a structured form, the trace tool and the trace strings and data fields of the trace tool are hierarchically indexed (i.e., identified) using respective numerical or alphanumerical identifiers. The identifiers may include names of the program product and the trace tool, a number or date of the current revision, number or names of the trace strings or data fields and the like.

To increase efficiency of interpretation of the diagnostic information, the contents of the trace tool are generally formatted as text documents. Such text documents are written and, during execution of the program product, updated using a non-coded (i.e., natural) human language. For example, the contents of the trace tool may be written in English or a language spoken by the developer of the trace tool or the program product. Hereafter, such a language is collectively referred to as "human language", and the term "developer" is interchangeably used in reference to the developer(s), owner(s), or debugger(s) of the trace tool or the program product.

At step 120, the developer creates one or more databases adapted for (i) selectively storing the identifiers and components of the diagnostic information (e.g., diagnostic messages) in the coded binary language and the human language and (ii) establishing cross-referencing links between the corresponding identifiers and components of the diagnostic information in both languages. In one embodiment, the databases contain tables of the respective identifiers and diagnostic messages in which the same elements are listed in both languages and mutually cross-referenced.

In operation, such databases allow to provide prompt translation of the respective portions of the contents of the trace tool from the human language into the coded binary language and vice versa, as discussed in reference to step 120 and step 150 (below).

In one embodiment, the developer creates a database containing identifiers of the trace tool and a database containing identifiers of the trace strings and data fields and the components of the diagnostic information. In both databases, such data is present in the human and coded binary languages and provided with cross-referenced links for translating the data from one language into another.

At step 130, the contents of the trace tool are coded. Specifically, the identifiers of the trace tool, trace strings, and data fields or at least portions thereof are coded using the coded binary language (i.e., translated from the human language into the coded binary language), and the trace tool is adapted for storing or updating in the coded binary language the diagnostic information being obtained during monitoring the execution behavior of the program product.

Coding procedures may be performed, for example, using the databases discussed in reference to step 120. In one embodiment, the original trace strings of the trace tool are encoded in a sequential order, and each coded trace string represents a binary sequence that includes a binary word encoding an identifier of the trace tool and one or more binary words encoding identifiers of the trace string and data fields and the components of the diagnostic information.

At step 140, the trace tool is released to a user of the program product. The trace tool may be released as a stand-alone software component or as a portion of the program product. The user of the program product is generally a remote data processing system or apparatus adapted for executing the program product and supporting the trace tool, for example, a data processing system, program product(s) testing facility and the like.

At step 150, the program product is executed while its operation is monitored by the trace tool recording the diagnostic information and composing a coded trace report where the accumulated diagnostic information is coded using the coded binary language. Such a report is herein referred to as an "encoded trace report".

At step 160, the coded trace report is transferred to the developer. In some embodiments, portions of the encoded trace report may be transferred during execution of the program product.

At step 170, the received encoded trace report is decoded by the developer from the coded binary language to the human language. The decoding procedures include translation of the identifier of the trace tool and identifiers and contents of the respective trace stings and their data fields.

In one embodiment, the developer uses the databases discussed in reference to step 120 to decode the encoded contents of the trace tool. Portions of the contents of the encoded trace report are sequentially translated from the coded binary language using the cross-referenced tables of the identifiers and components of the diagnostic information in each of these languages and then assembled together as a text document written in the human language. In one embodiment, the test document is outputted to the developer in the same format that was used for recording the contents of the trace tool at step 110.

At step 180, the developer analyses execution behavior of the program product using the diagnostic information presented as a readable text document.

Figure 2:
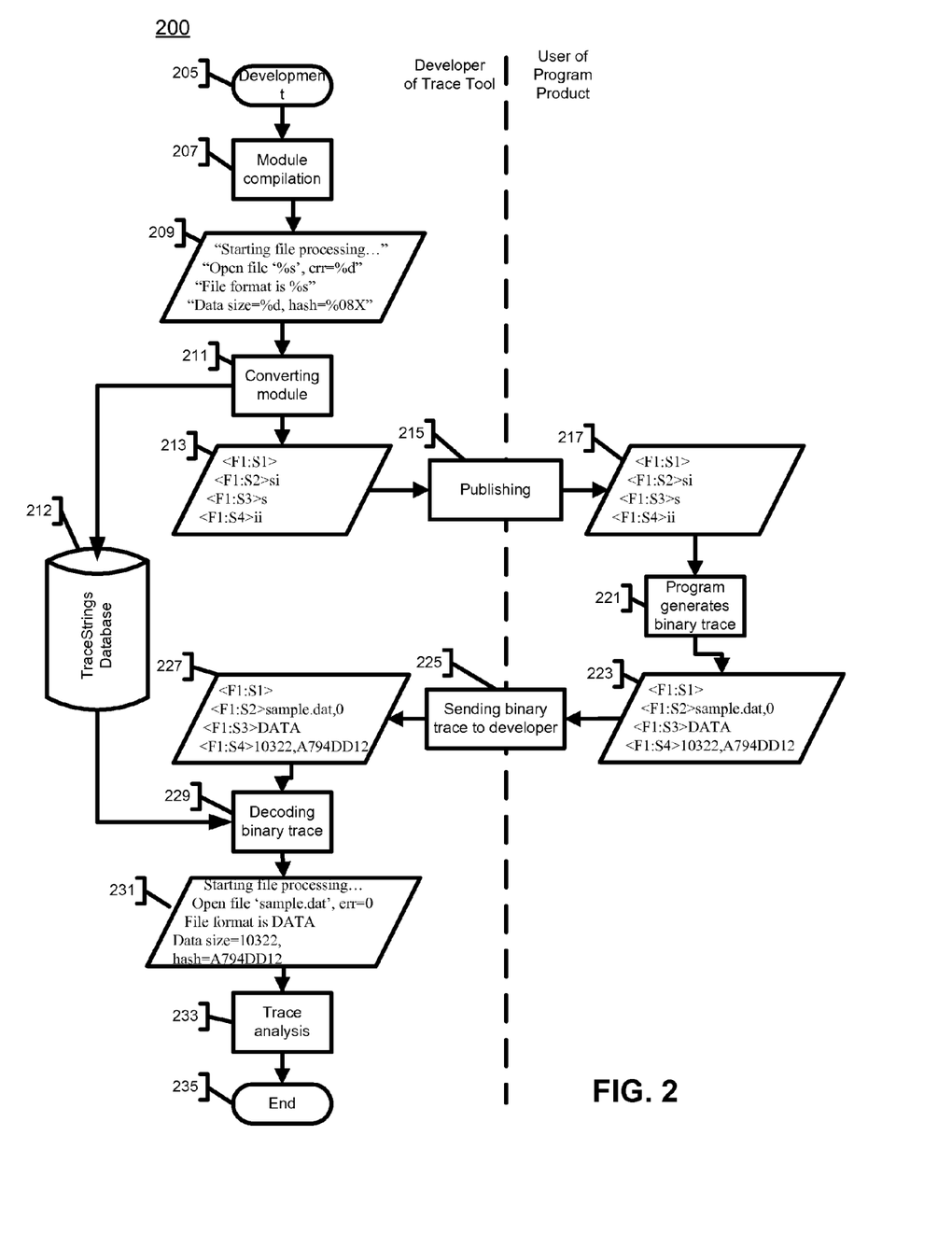
FIG. 2 illustrates execution of method steps in the method of FIG. 1.

With reference to FIG. 2, execution of method steps of the method 100 is illustrated using a sequence 200. The sequence 200 starts at step 205, where a program product is developed, and proceeds to step 207. At step 207, a trace tool for the program product is produced, and, at step 209, contents of the trace tool are formatted as a human language text document. At step 211, the trace tool, trace strings, and data fields are provided with respective identifiers and the contents of the trace strings and data fields are converted (i.e., translated) from the human language into a coded binary language.

At step 212, the respective data is stored in a database of trace strings (as shown, TraceStrings database) in both human and coded binary languages. At step 213, the trace tool encoded using the coded binary language is assembled. At steps 215 and 217, in a form of an executable file, the trace tool is respectively released to and received by a user of the program product. At step 221, in operation, the trace tool records and, using the coded binary language, encodes diagnostic information relating to the program product. At step 223, the trace tool assembles the diagnostic information and generates a trace report encoded using the coded binary language. At step 225, the encoded trace report is transferred back to a developer of the trace tool.

At step 227, the encoded trace report is received by the developer and, at step 229, the trace report is decoded using the data stored at step 212 in the database of trace strings. At step 231, the trace strings and information contained in their data fields are translated from the coded binary language into the human language and formatted as a text document. At step 233, the text document is outputted to the developer and, at step 235, the sequence 200 ends.

Figure 3:
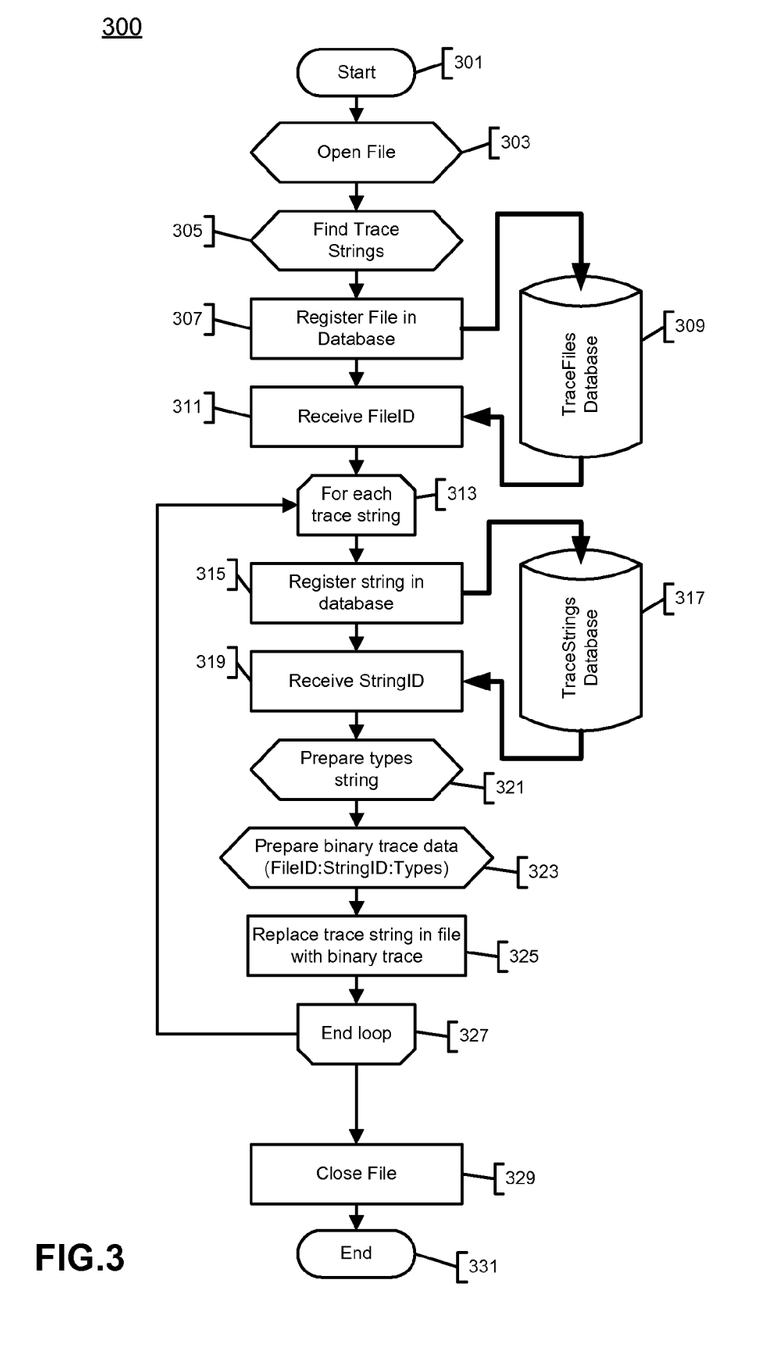
FIG. 3 illustrates encoding of contents of a trace tool in the method of FIG. 1.

With reference to FIG. 3, in one embodiment coding of the contents of the trace tool is performed in the method 100 using a sequence 300. The sequence 300 starts at step 301 and proceeds to step 303, where a trace file of the trace tool is opened. At step 305, the trace strings are identified in the trace file. At steps 307 and 309, the trace file is registered and stored in a database of trace files (as shown, TraceFiles database), respectively, and, at step 311, the trace file is assigned a coded binary identifier (as shown, FileID). Then, at step 313, a pre-determined set of operations is performed for each trace string of the trace tool.

In particular, at steps 315 and 317, a trace string is registered and stored, respectively, in a database of trace strings (as shown, TraceStrings database). Then, at step 319, the trace string is assigned a coded binary identifier (as shown, StringID) and each trace string becomes uniquely identified by the respective executable file and trace string identifiers. At step 321, data fields of the trace string are formatted in the coded binary language and, at step 323, a coded binary sequence representing the trace string is generated. At step 325, the coded binary sequence is used to replace the trace string in the executable file. The steps 315, 317, 319, 321, 323, and 325 are cyclically repeated for other trace strings of the trace tool until, at step 327, all trace strings have been similarly replaced. At step 329, after the trace strings are replaced with their respective coded binary sequences, coding of the trace tool from the human language in the coded binary language is completed, the trace file is closed and, at step 331, the sequence 300 ends.

Figure 4:
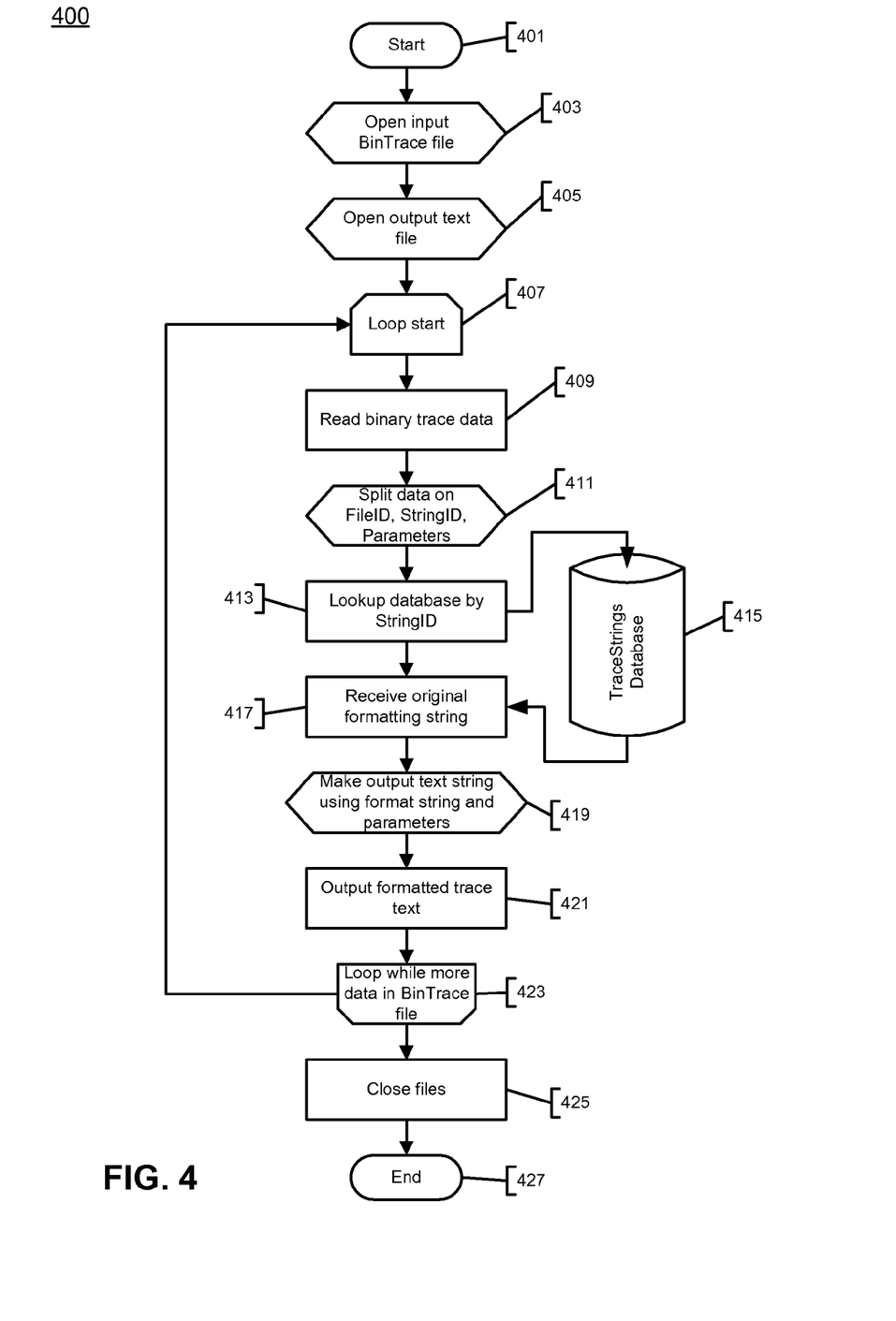
FIG. 4 illustrates decoding of contents of a trace report in the method of FIG. 1.

With reference to FIG. 4, in one embodiment decoding of the trace report is performed in the method 100 using a sequence 400. The sequence 400 starts at step 401 and proceeds to step 403, where a received file of the encoded trace report (as shown, BinTrace file) is opened. At step 405, the received file of the encoded trace report is prepared for outputting in a text format. Then, at step 407, a pre-determined set of operations is performed upon the contents of the file.

At step 409, the contents of the file are analyzed and, at step 411, identifiers of the trace file and trace strings are recognized and decoded and, in the respective trace strings, data fields are separated. At step 413, using an identifier of the trace file and an identifier of a trace string, a coded binary identifier of the trace string (as shown, StringID) is decoded. At step 415, using the binary identifier of the trace string, the corresponding human language text-based content of the trace string is found in a database of trace strings (as shown, TraceStrings database) and, at step 417, the trace string of the trace tool is translated into a human language.

At step 419, data fields of the trace string are similarly translated from the coded binary language into the human language and, at step 421, the decoded trace string is outputted in the human language in a text-based format. The steps 409, 411, 413, 417, 419, and 421 are cyclically repeated for other trace strings of the trace report until, at step 423, all trace strings have been outputted in the text-based format. At step 425, after decoding of the trace strings and data fields of the trace report from the coded binary language in the human language is completed, the trace report file is closed and, at step 427, the sequence 400 ends.

Figure 5:
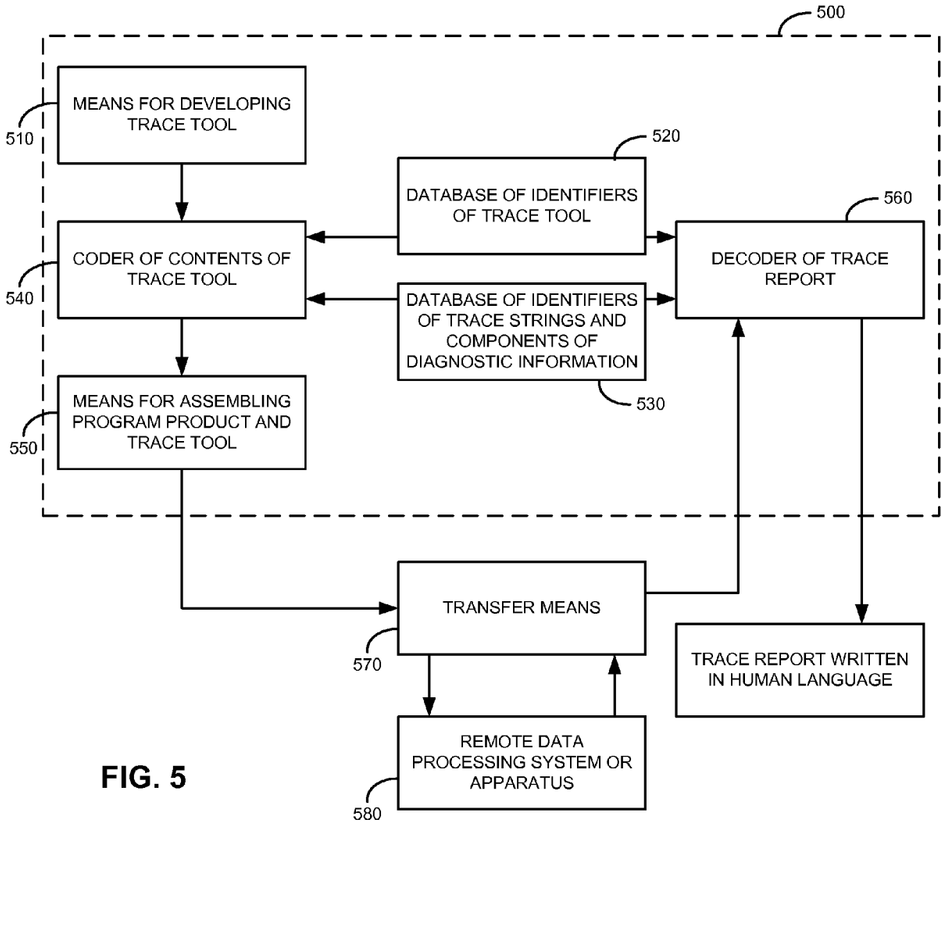
FIG. 5 illustrates an exemplary software configuration for implementing portions of the method of FIG. 1.

With reference to FIG. 5, an exemplary software configuration 500 for implementing portions of the method 100 includes a means 510 for developing the trace tool, a database 520 of the identifiers of the trace tool, a database 530 of identifiers of the trace strings and data fields thereof and components of the diagnostic information, a coder 540 of the contents of the trace tool, a means 550 for assembling the program product and encoded trace tool into a single assembly, and a decoder 560 of the trace report of the trace tool.

The means 510 produce the trace tool whose contents are formatted as a text document written in the human language, see 590. In operation, the trace tool monitors execution of a respective program product and collects the diagnostic information that may be used to assess execution behavior of the program product, as well as to improve or debug the program product.

The contents of the trace tool generally comprise a structured plurality of trace strings each having one or more data fields adapted for recording the diagnostic information. The trace tool, trace strings and data fields are identified using numerical or alphanumerical identifiers.

In some embodiments, at least a portion of the trace strings may be grouped to form files of the trace strings. Such files are similarly provided with corresponding identifiers. In an alternate embodiment where the trace tool is developed using a remote processor, the means 510 is optional.

In the depicted embodiment, the database 520 contains cross-referenced tables containing the identifiers of the trace tool in the human and coded binary languages, and the database 530 contains tables of the identifiers of the trace strings and data fields and a nomenclature of the diagnostic messages. When the trace tool comprises files of the trace strings, their respective identifiers are also included in the database 520 or 530.

Using the databases 520 and 530, the coder 540 translates contents of the trace tool from the human language into the coded binary language. In one embodiment, each trace string is represented by a binary sequence including a binary word encoding an identifier of the trace tool and one or more binary words encoding identifiers of the trace string and data fields and the diagnostic information. In alternate embodiments, trace traces or portions thereof may be represented by a different number of the binary words.

The means 550 for assembling the program product and encoded trace tool is used when the trace tool is a portion of the program product; otherwise, the means 550 is optional.

The trace tool having encoded contents is transferred to a user of the program product to monitor execution behavior of the program product. In operation, during the execution of the program product, the trace tool records the diagnostic information obtained in the data fields of the corresponding tracing strings in the coded binary language and compiles an encoded trace report, which is transferred to the developer.

Illustratively, these transfers are performed using transfer means 570 (e.g., wired, wireless, or optical medium), whereas execution of the program product and monitoring of execution behavior thereof is provided using a remote data processing system (or apparatus) 580.

The decoder 560, using the databases 520 and 530, translates the received encoded contents of the trace tool from the coded binary language into the human language and outputs them to the developer or other authorized party as a formatted text document.

Figure 6:
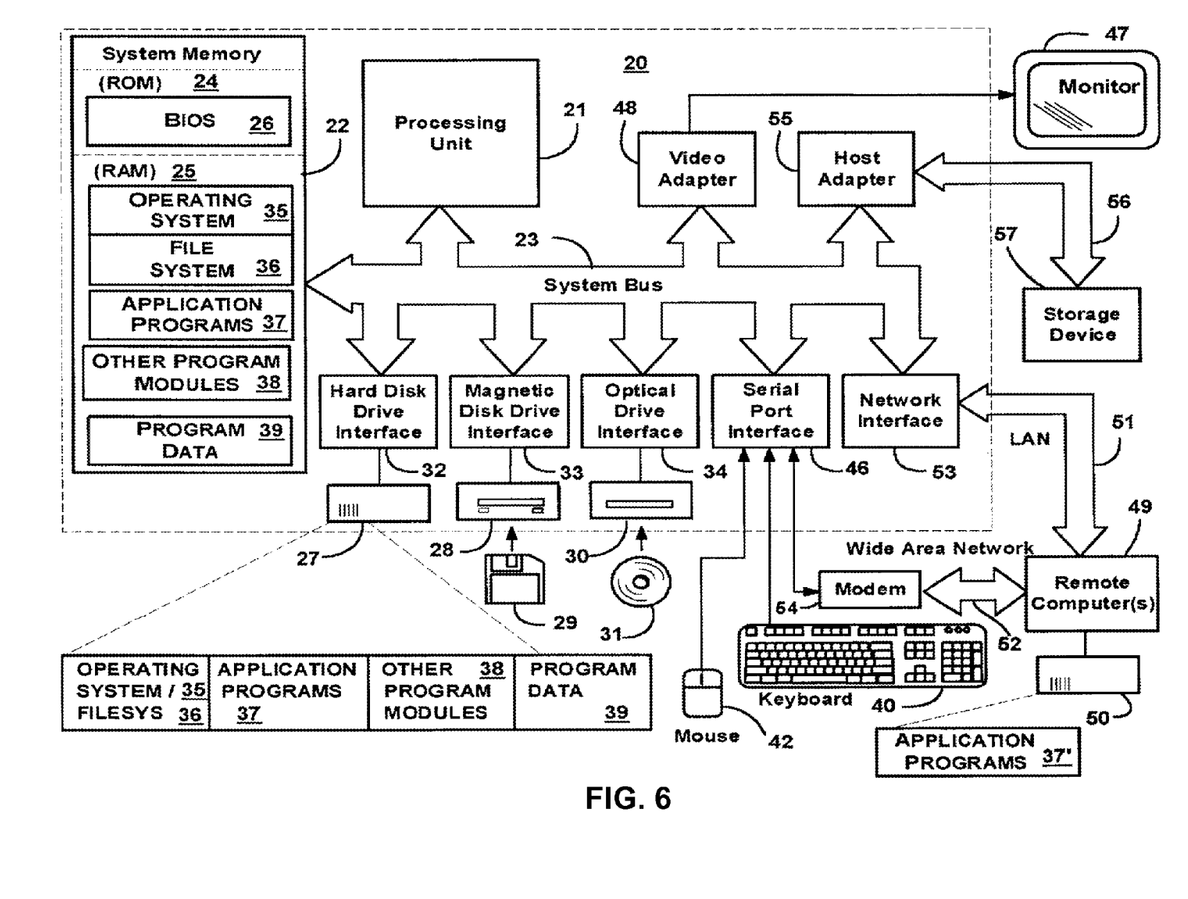
FIG. 6 illustrates an architecture of an exemplary computer system that may be used to implement portions of the method of FIG. 1.

With reference to FIG. 6, an exemplary system for implementing the invention includes a general purpose computing device in the form of a personal computer or server 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes a read-only memory (ROM) 24 and random access memory (RAM) 25. A basic input/output system 26 (BIOS), containing the basic routines that help to transfer information between the elements within the personal computer 20, such as during start-up, is stored in ROM 24. The personal computer 20 may further include a hard disk drive 27 for reading from and writing to a hard disk, not shown herein, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (e.g., Microsoft Windows™ 2000). The computer 20 includes a file system 36 associated with or included within the operating system 35, such as the Windows NT™ File System (NTFS), one or more application programs 37, other program modules 38 and program data 39. A user may enter commands and information into the personal computer 20 through input devices such as a keyboard 40 and pointing device 42. Other input devices (not shown) may include a microphone, joystick, game pad, satellite dish, scanner or the like. These and other input devices are often connected to the processing unit 21 through a serial port interface 46 that is coupled to the system bus, and they may also be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers 49. The remote computer (or computers) 49 may be another personal computer, a server, a router, a network PC, a peer device or other common network node, and it typically includes some or all of the elements described above relative to the personal computer 20, although here only a memory storage device 50 is illustrated. The logical connections include a local area network (LAN) 51 and a wide area network (WAN) 52. Such networking environments are common in offices, enterprise-wide computer networks, Intranets and the Internet.

In a LAN environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, the program modules depicted relative to the personal computer 20, or portions thereof, may be stored in the remote memory storage device. It will be appreciated that the network connections shown are merely exemplary and other means of establishing a communications link between the computers may be used. Such computers as described above can be used in conventional networks, e.g., the Internet, local area networks, regional networks, wide area networks, and so forth. These networks can link various resources, such as user computers, servers, Internet service providers, telephones connected to the network, and so on.

Aspects of the present invention have illustratively been described above within the context of trace tool adapted for monitoring execution behavior of a respective program product. The invention may also be utilized within context of other diagnostic, control, or measuring programmable tools that are used in environments where protection from an unauthorized access to information accumulated therein is desirable. It has been contemplated and is within the scope of the invention that the method 100 is utilized within the context of such programmable tools.

The method 100 may be implemented in hardware, software, firmware, or any combination thereof in a form of a computer program product comprising computer-executable instructions, with the various steps implemented as software modules, or optionally several steps combined into a single module. When implemented in software, the computer program product may be stored on or transmitted using a computer-readable recording medium adapted for storing the computer-executable instructions or transferring the computer program product from one computer to another.

Having thus described a preferred embodiment, it should be apparent to those skilled in the art that certain advantages of the described method and apparatus have been achieved. It should also be appreciated that various modifications, adaptations and alternative embodiments thereof may be made within the scope and spirit of the present invention. The invention is further defined by the following claims.

What is claimed is:

1. A method of monitoring execution behavior of a program product, the method comprising:
    (a) providing, for the program product, a trace tool producing a trace tool output having human-readable trace strings written in a human language, the trace strings including human-readable data fields for recording diagnostic information related to executable instructions of the program product;
    (b) storing identifiers of the trace tool, the trace strings and the data fields of the diagnostic information in a binary language and the human language, to enable cross-referencing the identifiers and the diagnostic information in the binary and human languages, for converting contents of the trace tool output from one language into another;

(c) monitoring execution of the program product using the trace tool;

(d) using the trace tool, producing an encoded trace report containing the binary trace tool output with the human readable trace strings and human readable data fields converted to their respective binary identifiers; and (e) decoding the binary identifiers of the encoded trace report into the human language strings using the stored cross-referencing.

2. The method of claim 1, further comprising storing the identifiers and the diagnostic information in the binary and human languages in a database, to enable the cross-referencing.

3. The method of claim 1, wherein the human language is a natural human language.

4. The method of claim 1, wherein step (d) further comprises formatting a trace string as a binary sequence including (i) a binary word encoding an identifier of the trace tool and (ii) one or more binary words encoding identifiers of the trace string and data fields and the diagnostic information.

5. The method of claim 1, wherein step (e) further comprises outputting the trace strings in the human language.

6. The method of claim 1, wherein the program product is executed using a remote data processing apparatus.

7. A non-transitory computer-readable storage medium having computer executable program logic stored thereon for executing on a processor, the computer executable program logic including a computer program code adapted to perform the following steps:

(a) providing, for the program product, a trace tool producing a trace tool output having human-readable trace strings written in a human language, the trace strings including human-readable data fields for recording diagnostic information related to executable instructions of the program product;

(b) storing identifiers of the trace tool, the trace strings and the data fields of the diagnostic information in a binary language and the human language, to enable cross-referencing the identifiers and the diagnostic information in the binary and human languages, for converting contents of the trace tool output from one language into another;

(c) monitoring execution of the program product using the trace tool;

(d) using the trace tool, producing an encoded trace report containing the binary trace tool output with the human readable trace strings and human readable data fields converted to their respective binary identifiers; and (e) decoding the binary identifiers of the encoded trace report into the human language strings using the stored cross-referencing.

8. A system for monitoring execution behavior of a program product, the system comprising:

a processor; and a memory storing instructions of an operating system and an application program that, when executed by the processor, provides:

(a) a trace tool producing a trace tool output having human-readable trace strings written in a human language, the trace strings including human-readable data fields for recording diagnostic information related to executable instructions of the program product;

(b) a set of identifiers of the trace tool, a set of trace strings and a set of data fields of the diagnostic information in a binary language and the human language, to enable cross-referencing the identifiers and the diagnostic information in the binary and human languages, for converting contents of the trace tool output from one language into another;

(c) based on the trace tool's monitoring of execution of the program product, an encoded trace report produced by the trace tool containing the binary trace tool output with the human readable trace strings and human readable data fields converted to their respective binary identifiers; and (e) a set of decoded the binary identifiers of the encoded trace report into the human language strings using the stored cross-referencing.

9. The system of claim 8, wherein the identifiers and the diagnostic information in the binary and human languages are stored in a database, to enable the cross-referencing.

10. The system of claim 8, wherein the human language is a natural human language.

11. The system of claim 8, wherein each trace string is formatted as a binary sequence including (i) a binary word encoding an identifier of the trace tool and (ii) one or more binary words encoding identifiers of the trace string and data fields and the diagnostic information.

12. The system of claim 8, wherein the trace strings are outputted in the human language.

13. The system of claim 8, wherein the program product is executed using a remote data processing apparatus.

14. The system of claim 8, wherein the program product and the trace tool are assembled into a single assembly.

* * * * *